US010625696B2

(12) United States Patent
Crismon

(10) Patent No.: US 10,625,696 B2
(45) Date of Patent: Apr. 21, 2020

(54) CONFIGURABLE BUMPER AND METHOD FOR CONSTRUCTING A BUMPER

(71) Applicant: Jon A. Petty, Saint George, UT (US)

(72) Inventor: David Crismon, Pleasant Grove, UT (US)

(73) Assignee: PHOENIX INVENTORS, St. George, UT (US)

( * ) Notice: Subject to any disclaimer, the term of this patent is extended or adjusted under 35 U.S.C. 154(b) by 68 days.

(21) Appl. No.: 15/801,267

(22) Filed: Nov. 1, 2017

(65) Prior Publication Data

US 2018/0118141 A1    May 3, 2018

Related U.S. Application Data

(60) Provisional application No. 62/415,773, filed on Nov. 1, 2016.

(51) Int. Cl.
| | | |
|---|---|---|
| *B60R 19/04* | (2006.01) | |
| *B60R 19/28* | (2006.01) | |
| *B60R 19/32* | (2006.01) | |
| *B60R 19/36* | (2006.01) | |
| *B60R 19/40* | (2006.01) | |
| *B60R 19/18* | (2006.01) | |
| *B60D 1/42* | (2006.01) | |
| *B60D 1/56* | (2006.01) | |
| *B60R 19/26* | (2006.01) | |

(52) U.S. Cl.
CPC .............. *B60R 19/40* (2013.01); *B60R 19/04* (2013.01); *B60R 19/28* (2013.01); *B60R 19/32* (2013.01); *B60R 19/36* (2013.01); *B60D 1/42* (2013.01); *B60D 1/56* (2013.01); *B60R 2019/186* (2013.01); *B60R 2019/262* (2013.01)

(58) Field of Classification Search
CPC ......... B60R 19/04; B60R 19/38; B60R 19/40; B60R 19/28; B60R 19/32; B60R 19/36; B60R 19/24; B60R 2019/186; B60R 2019/262; B60R 2019/1833; B60R 2019/1846
USPC ........ 293/102, 118, 119, 153, 149; 29/897.2
See application file for complete search history.

(56) References Cited

U.S. PATENT DOCUMENTS

| | | | |
|---|---|---|---|
| 1,651,005 A | 11/1927 | Veale | |
| 1,705,119 A | 3/1929 | Jacobs | |
| 3,907,352 A | 9/1975 | Spain et al. | |
| 4,130,312 A * | 12/1978 | Cooper, Sr. ............. | B60R 19/04 293/153 |
| 4,635,983 A * | 1/1987 | Boland .................... | B66D 1/00 254/323 |

(Continued)

FOREIGN PATENT DOCUMENTS

DE    102012022613 A1 *  5/2014  ............. B60R 19/04

*Primary Examiner* — Gregory A Blankenship
(74) *Attorney, Agent, or Firm* — David Meibos; Maywood IP Law

(57) ABSTRACT

A configurable bumper for a vehicle may include a center body, one or more telescoping end assemblies adapted to slide in a direction parallel to the axis of the center body and perpendicular to the axis of vehicle, and a locking mechanism for each telescoping end assembly. The telescoping end assemblies may be secured in at least two different axial positions on the center body. A method for manufacturing a bumper may include forming bumper components in near-net shape by a profile extrusion process and sizing to length.

17 Claims, 3 Drawing Sheets

(56) References Cited

U.S. PATENT DOCUMENTS

| | | | |
|---|---|---|---|
| 5,000,499 A | 3/1991 | Shepard et al. | |
| 6,609,740 B2 * | 8/2003 | Evans | B60R 19/18 |
| | | | 293/120 |
| 6,926,322 B2 * | 8/2005 | Browne | B60R 19/40 |
| | | | 293/114 |
| 7,063,364 B2 | 6/2006 | Bird et al. | |
| 7,478,849 B2 * | 1/2009 | Fortin | B60R 19/18 |
| | | | 293/120 |
| 8,414,041 B2 * | 4/2013 | Paare | B60R 19/18 |
| | | | 293/154 |
| 8,505,990 B2 * | 8/2013 | Czopek | B60R 19/18 |
| | | | 293/102 |
| 8,905,445 B2 | 12/2014 | Critchley | |
| 8,991,544 B1 * | 3/2015 | Stratten | B60R 19/04 |
| | | | 180/274 |
| 10,081,321 B2 * | 9/2018 | Fabiano | B60R 19/023 |
| 2006/0197347 A1 | 9/2006 | Hoffman et al. | |
| 2007/0029824 A1 * | 2/2007 | Hodoya | B60R 19/18 |
| | | | 293/102 |
| 2011/0020665 A1 * | 1/2011 | Serafin | C22C 21/00 |
| | | | 428/629 |
| 2015/0069770 A1 * | 3/2015 | Hashimoto | B60R 19/18 |
| | | | 293/102 |
| 2015/0115633 A1 * | 4/2015 | Braunbeck | B60R 19/04 |
| | | | 293/132 |
| 2018/0118141 A1 * | 5/2018 | Crimson | B60R 19/28 |
| 2018/0178744 A1 * | 6/2018 | Wilke | B60R 19/56 |
| 2019/0168700 A1 * | 6/2019 | Lattorff | B60R 19/04 |

\* cited by examiner

CONFIGURABLE BUMPER AND METHOD FOR CONSTRUCTING A BUMPER

CROSS-REFERENCE TO RELATED APPLICATIONS

The present application claims the benefit of U.S. Provisional Patent Application Ser. No. 62/415,773 filed on Nov. 1, 2016 for "Configurable Bumper and Method for Constructing a Bumper," which is incorporated by reference as though set forth herein in its entirety.

BACKGROUND OF THE INVENTION

Technical Field of the Invention

This invention relates to a configurable vehicle bumper for use under changing driving conditions and regulatory requirements. This invention also relates to a manufacturing method for constructing a bumper.

Background Art

Many sport utility vehicles and light trucks are suited for off-road driving as well as highway driving. For certain off-road driving challenges, however, it may be desirable for these vehicles to be customized in order to provide desired performance. Such customizations may include alterations to mechanical systems such as the vehicle's suspension and transmission, or may include body modifications, such as removal of roof, doors, bumpers, and fenders. The latter group of modifications offers increased driver visibility, obstacle clearance, and wheel mobility, and reduces risk of damage to vulnerable parts of the vehicle.

Some highly customized vehicles become single-use vehicles that are used for recreational purposes only. These are only operated in an off-road location, and are typically towed over paved roads to and from the off-road location. Most other vehicles in the aforementioned classification are multi-use, where they must provide daily transportation on paved roads and also provide for occasional excursions off road. Because these multi-use vehicles are driven on public roadways, they must comply with transportation safety requirements when on these roads. Unfortunately, some safety requirements reduce the ability of the vehicle to successfully navigate over and around some obstacles found off road, and pose a higher risk of damage to those parts while off-road driving. It is therefore desirable to provide for convenient means of configuring a multi-use vehicle for optimal off-road performance, then re-configuring it for compliance with public roadway safety regulations.

Bumpers are included on motor vehicles to prevent or reduce damage to a motor vehicle, primarily in low speed collisions. Key areas protected by bumpers include the vehicle's hood or trunk, grille, fuel and exhaust systems, cooling systems, and vehicle lights. Bumpers may also be designed to reduce the severity of injury to pedestrians that may come in contact with the moving vehicle, by reducing the risk of entanglement with the wheel or of being forced under the vehicle. In many of these functions, particularly the last group, it is advantageous for the bumper to extend in front of (or behind, when considering the rear bumper) the vehicle's wheels. Indeed, transportation safety regulations in several locations require bumpers to extend the full track width of the vehicle; track width may be defined in this case as the distance between centerlines of the two wheels that are on the same axle. When driving off road, however, portions of the bumper that extend directly in front of the vehicle's wheel wells may restrict movement of the vehicle's wheels, or may limit the approach angle of the vehicle, potentially making the vehicle's tires lose contact with the ground surface, promoting unsafe tipping of the vehicle, or causing damage to the bumper.

SUMMARY

In one embodiment, a configurable bumper comprises a center body, telescoping end assemblies, and locking mechanisms. The center body and telescoping end assemblies are manufactured from base components that each have constant cross sections across their respective lengths. The bumper's center body is attached rigidly to a vehicle's frame and telescoping end assemblies are slidably attached to the center body such that they may slide in a direction parallel to the axis of the center body and perpendicular to the axis of vehicle. The locking mechanisms secure the telescoping end assemblies in at least two different axial positions on the center body.

BRIEF DESCRIPTION OF THE DRAWINGS

The objects, aspects, and advantages of the present invention will become evident from the following detailed description. Exemplary illustrations are provided to further aid understanding of the invention but are not intended to limit the scope of the invention. These illustrations are divided into a series of figures where.

DETAILED DESCRIPTION

Figure 1:
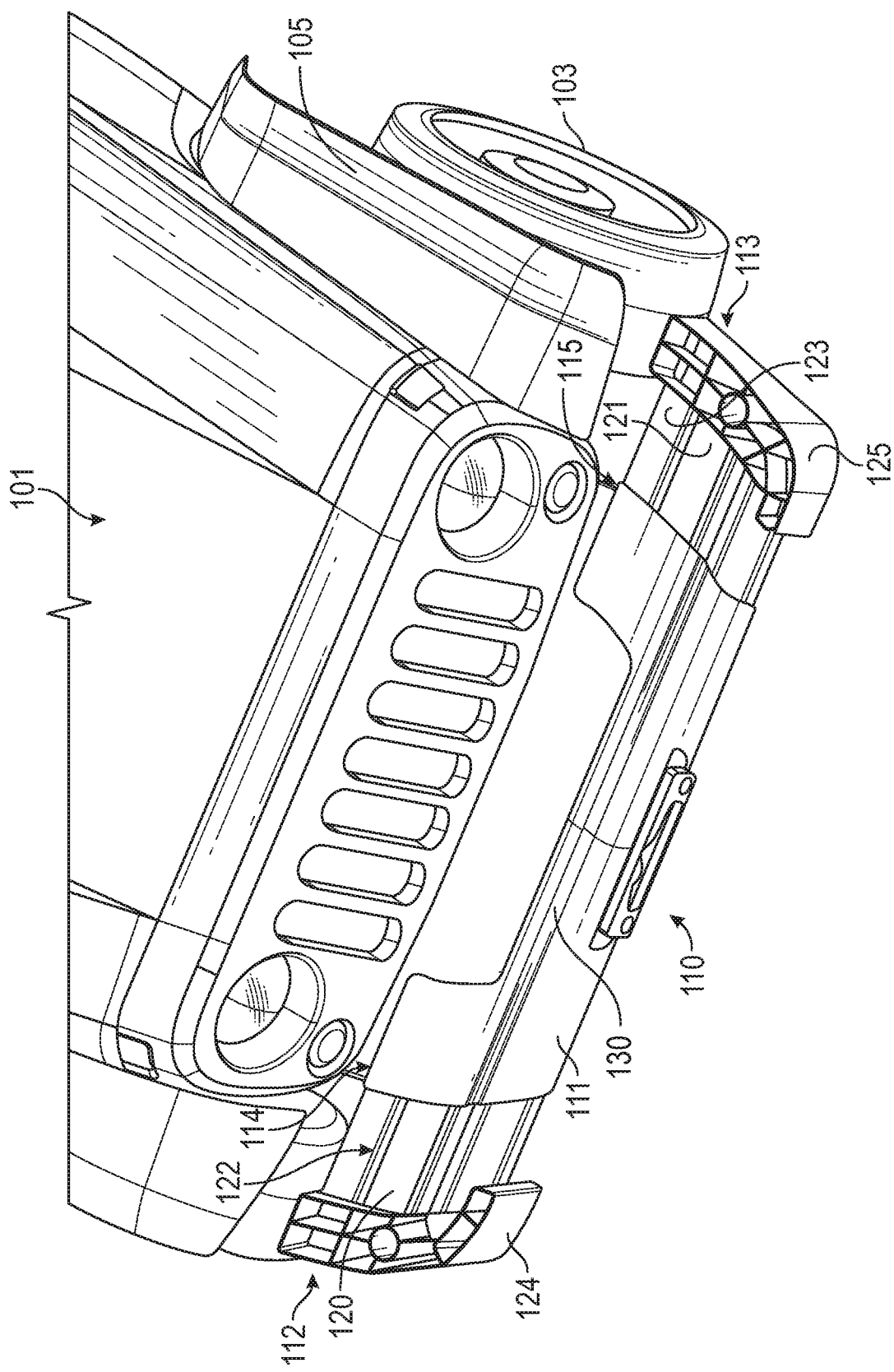
FIG. 1 is a front view of an exemplary sport utility vehicle having a configurable bumper according to the present invention, where the bumper is configured in a first configuration that is responsive to transportation safety requirements.

It is an object of the present invention to provide a vehicle bumper that is configurable between at least two distinct operating configurations: one where the bumper satisfies regulatory and safe driving requirements for paved roadways, and one where the bumper is optimized for off-road driving conditions. It is a further object of this invention to provide on-board storage for all bumper parts used in each configuration. It is yet a further object of this invention to simplify the configuration process so that it encourages the configuration process in a repetitive manner in order to provide for optimal configurations for both conditions. It is still a further object of this invention to provide an aesthetically pleasing look for the bumper in all operating configurations. Also, it is an object of the present invention to provide cost-effective manufacturing for an aesthetically pleasing bumper.

Ideally, a bumper for a multi-use vehicle would be configurable to a first position that complies with all transportation safety requirements and a second position that does not extend in front of the wheel wells for driving off-road. The art is replete with examples of bumpers that can be configured to multiple positions in a direction parallel to the vehicle's primary direction of travel. The utility of these bumper reconfigurations varies from securing parking space and providing external storage on the vehicle to optimizing impact energy dissipation.

Inventions that provide for changing bumper configurations in a direction perpendicular to the vehicle's direction of travel, such as is the object of this invention, have received somewhat less inventive publication. Early patent art (see for example U.S. Pat. No. 1,705,119) includes bumper assemblies with rearwardly sweeping end caps that are hingedly attached to a center bumper member in a manner such that they can sustain impact when the vehicle is moving in a forward direction but they rotate forward and inward if hooking a vehicle or other object from the reverse direction. These movable end caps are configured to spring back into their previous configuration once the hooked object is released. Hence, they do not contemplate a separate operating state for the vehicle wherein the end caps are fixed in a position other than the primary operating position. Without contemplation of a second operating state, the device does not suggest a means for fixing the end caps in the second state.

More recent art of a similar nature provides for manually moving end caps out of their normal operating position in order to allow improved access to engine compartments in large trucks. Repositioning of bumper end caps occurs by rotation or a combination of lateral translation and rotation (see U.S. Pat. No. 7,063,364 and US20060197347), but the final configuration does not anticipate nor facilitate vehicular movement while the bumper is thus configured.

In an effort to facilitate manufacturing and/or reduce repair costs, some inventions in the art have utilized a modular bumper design, including end caps rigidly bolted to a center bumper member. In one embodiment of a modular bumper (see U.S. Pat. No. 8,905,445), the modular construction helps disassociate end caps from the rest of the bumper and from other attached surfaces such as engine housings, thereby localizing any damage sustained by the bumper to smaller, more easily replaced components. Other embodiments incorporate deliberately weakened connection points between the central bumper and end caps to provide for preferential breaking away of the end caps when impacted with sufficient force (U.S. Pat. Nos. 3,907,352 and 5,000,499). All of these designs presume a single bumper configuration that is not operable without all parts installed.

Some commercial manufacturers have designed modular bumpers such that end caps may be removed specifically for off-road use or for aesthetic appeal. While these bumper designs, and for that matter, their modular predecessors just discussed, may all indeed be reconfigured to a laterally shorter form by removing the end caps, these bumper systems offer no provision for a simple, expedited, and repetitive removal process. Moreover, no provision is given for storage of removed parts, leading to potential loss or damage of these parts. Without addressing these two factors, a modular bumper design is less likely to be reconfigured for both use conditions; thus these existing designs do not address in a practical manner the needs described above. As an example, sometimes vehicle owners will configure a bumper such that it is suitable for off-road use, and then drive the vehicle on paved roads in that condition contrary to regulatory requirements and safety, because the reconfiguration process is inconvenient.

U.S. Pat. No. 1,651,005 describes a rear bumper with end caps that are hingedly attached to a center bumper member so they can rotate and store behind the center bumper member for more compact shipping. While this concept might be applicable for reconfiguring a bumper for off-road use also, and offers the advantage of on-board storage of end caps, it dictates bumper geometry that is less robust in the end cap storage location to accommodate compact storage. On the other hand, if the geometry of this particular center bumper member is redesigned so that it is optimized for robustness against impact, storage of the hinged end caps on-board becomes difficult without increasing the length of the vehicle or awkwardly stacking bumper components atop each other.

Various exemplary embodiments of the invention will now be described in connection with FIGS. 1-3. The following description is presented by way of example, and is not intended to limit the scope of the invention, which is instead delineated by the appended claims.

Referring to FIG. 1, a vehicle 101 is supplied with a configurable bumper assembly 110, mounted to its front and/or rear end. Bumper assembly 110 comprises a center body 111, telescoping end assemblies 112 and 113, and locking mechanisms 114 and 115. Center body 111 is attached rigidly to the vehicle's frame 102 (see FIG. 3). In one exemplary embodiment, the center body contains attachment points 130 that may be useful for securing accessories such as lights and push bars to the bumper assembly. These attachment points may extend the entire length of center body 111 and are formed in the shape of a "T" slot (see also FIG. 3).

Telescoping end assemblies 112 and 113 are slidably attached to center body 111 such that they may slide in a direction parallel to the axis of center body 111 and perpendicular to the axis of vehicle 101. For the purpose of clarity, when description is made of items being arrayed in a parallel or perpendicular attitude, it shall be understood to mean that these comparative standards are within standard tolerances achieved in the industry by common manufacturing processes known in the art, and may include minor deviations from a perfectly parallel or perpendicular attitude in order to provide for desired aesthetic characteristics or to provide mechanical clearance with objects on the vehicle that are proximal to the bumper assembly.

Locking mechanisms 114 and 115 secure telescoping end assemblies 112 and 113 in the desired axial positions on center body 111. Locking mechanisms 114 and 115 may each include a simple spring-loaded pin as is common in the art. The pin may be oriented so that it engages one of at least two holes in the telescoping end assemblies to enable locking in at least two discrete positions. Other locking mechanisms such as those employing a wedge or cam may be used in lieu of the pin to provide for infinitely adjustable positioning of the telescoping end assemblies. While the locking mechanisms could include simple bolted connections, they may advantageously be selected such that they do not require hand tools to engage and disengage them, and would not require handling or storage of loose parts removed from the assembly that would be subject to loss or damage during storage.

In the embodiment of FIG. 1, telescoping end assemblies 112 and 113 may include bearing surfaces 120 and 121 that are adapted to slide laterally inside center body 111. Glides 122 and 123 are interposed between the inner surface of center body 111 and bearing surfaces 120 and 121, and serve to minimize play between the center body and the telescoping end assemblies and provide for smooth, non-galling sliding. Stops of a type that is common in the art (not shown) may be attached to the telescoping end assemblies as a failsafe to prevent accidental complete removal of the telescoping end assemblies from within the confines of center body 111. These stops may be manually removed to enable deliberate removal of the telescoping end assemblies. The telescoping end assemblies may also include end caps 124 and 125 that are rigidly attached to the bearing surfaces by permanent attachment such as welding or by removable attachment such as bolting. These end caps may be designed in various geometries to provide the desired functionality and aesthetics at the extremities of bumper assembly 110. The end caps may also be designed to comply with differing transportation safety regulations found internationally; for example, they may provide the function of closing the gap between fender flare 105 and the bumper assembly to protect against forward-thrown tire debris, as is required in certain localities. In one alternative embodiment, telescoping end assemblies 112 and 113 may be adapted to slide laterally on the outside of center body 111.

FIG. 1 depicts a first operational bumper configuration, wherein bumper assembly 110 extends in front of wheels 103. In the most preferred embodiment of the present invention, the length of the bumper assembly, with telescoping end assemblies extended as shown, is greater than or equal to the track width of the vehicle. This configuration may be most beneficially used for driving on paved roadways and complying with regulatory requirements for such. The lengths of bearing surfaces 120 and 121 are selected by methods common in the art to be long enough such that, when configured according to FIG. 1, there is suitable strength and rigidity in the bumper assembly to sustain a low energy impact to the telescoping end assemblies, such as that encountered during a low velocity impact with another object.

Figure 2:
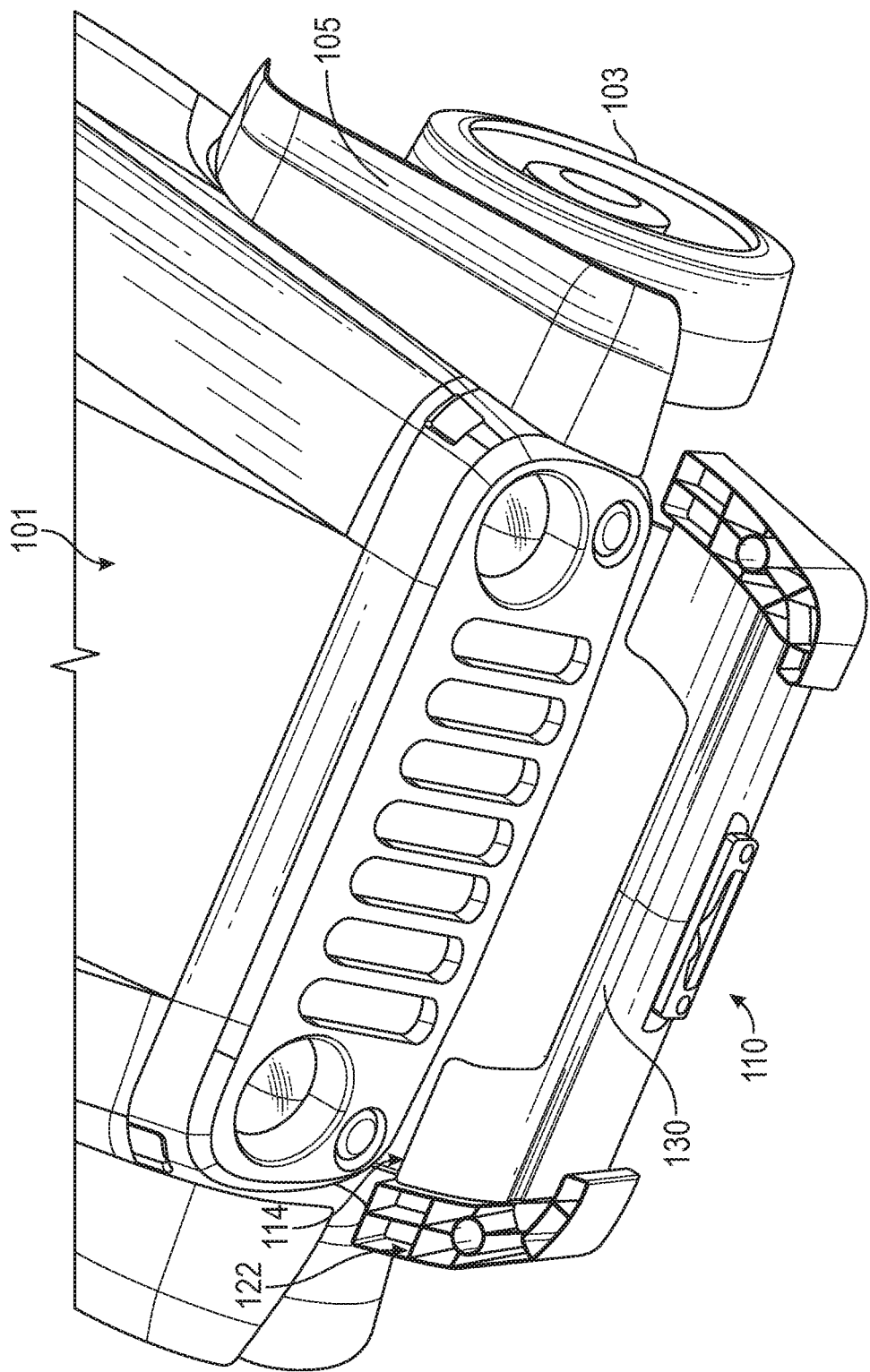
FIG. 2 is a front view of an exemplary sport utility vehicle having a configurable bumper according to the present invention, where the bumper is configured in a second configuration that is optimal for off-road driving.

FIG. 2 depicts a second operational configuration, wherein bumper assembly 110 leaves the space in front of wheels 103 substantially unobstructed by the telescoping end assemblies. This configuration may be most beneficially used for driving off road, thereby optimizing tire clearance and trail visibility. Advantageously, no components present in the first operational configuration need be removed from the assembly to obtain the second operational configuration; locking mechanisms 114 and 115 are simply released, allowing end assemblies 112 and 113 to slide to the second operational configuration, followed by re-engagement of the locking mechanisms. As shown in FIG. 1 and FIG. 2, portions of bearing surfaces 120 and 121 that were previously exposed when the bumper was configured in its first operational configuration (FIG. 1) are hidden inside center body 111 in the second operational configuration. The selected lengths of bearing surfaces 120 and 121 are short enough to allow for unobstructed access to slots 131 and 132 found in center body 111, which may be used to facilitate mounting a winch or other accessories on the bumper. In the most preferred embodiment, telescoping end assemblies 112 and 113 are contoured to nest over portions of center body 111, as shown in FIG. 2, such that they provide for a compact and visually appealing second operational configuration.

In the embodiment of FIG. 2, center body 111 has a cross section that is constant about its length. For the purpose of clarity, when description is made of items being constant in cross section, it shall be understood to mean that this comparative standard is within standard tolerances achieved in the industry by common manufacturing processes known in the art, and may include minor deviations from a perfectly constant cross section in order to provide for desired aesthetic characteristics or to provide mechanical clearance with objects on the vehicle that are proximal to the described part. Center body 111 is shown in FIG. 1 and FIG. 2 as having a straight axis; however, in alternate embodiments, it may also have a curved axis to facilitate aesthetic or other geometrical design objectives, while still having a cross section that is within the scope of the invention. By making the cross section constant about its length, center body 111 may be manufactured by a profile extrusion manufacturing process or other similar process. This type of manufacturing process offers benefits over the processes typically used in bumper manufacture, most importantly including production of near-net-shape raw materials that require little or no welding, bending, or other labor-intensive operations.

Figure 3:
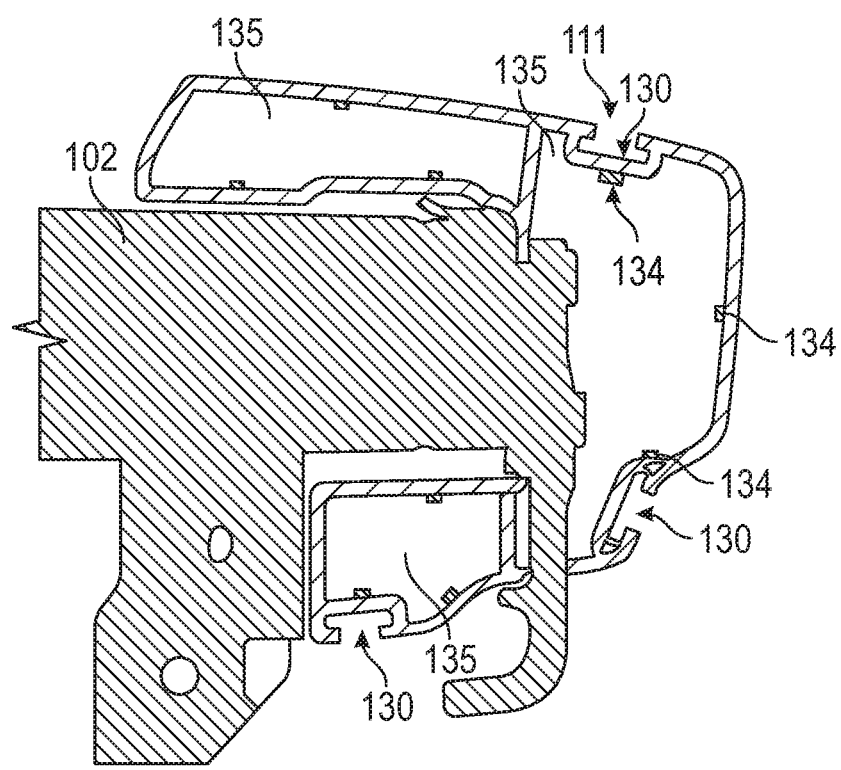
FIG. 3 is a left side view showing a cross section of the configurable bumper in a region where it connects to the frame of an exemplary sport utility vehicle.

FIG. 3 provides an example of these benefits as applied to the cross section of center body 111. As shown, the center body may be formed in the shape of a double-walled U-shape that mounts conveniently to the vehicle frame 102 and in a manner that is hidden when viewed from the front of the vehicle. The outer profile of the bumper may be selected to provide the desired aesthetic form shown, and also contains functional features such as attachment points 130. The inner profile of the bumper contains guides 134 for glides 122 and 123 (see FIG. 1). The double walls provide for added bumper thickness that helps to isolate the vehicle from low-energy impact; they also serve to provide longitudinal rigidity to the bumper. Cavities 135 collectively serve to guide bearing surfaces 120 and 121 (see FIG. 1). Thus, to finish manufacture of center body 111, the profile extrusion of constant cross section is simply cut to length. The manufacturing benefit of having these and other functional and aesthetic features formed into the bumper raw material via a profile extrusion process versus other manufacturing processes is evident. Center body 111 may advantageously be cut to length using cuts that are oblique to the axis of the profile extrusion thereby giving the center body an interesting and visually appealing look. In another embodiment of the present invention, center body 111 is cut to length using cuts that have a radius of curvature.

In a manner similar to that just described, bearing surfaces 120 and 121 may have cross sections that are constant about their lengths and may be straight or curved, in order to facilitate the slidable connection with center body 111. Further, end caps 124 and 125 may also have constant cross sections to optimize manufacturing. These may have straight or curved axes and may be cropped lengthwise at oblique angles to the axis of the cross section to provide an interesting and visually appealing look. Alternatively, they may be cropped using cuts that have a radius of curvature. The end cap cross section may also include attachment locations for accessories, including, for example, a socket 133 (FIG. 2) for a tent post to support a roof-top tent, or other such devices.

Bumper assembly 110 may be constructed from the group of structural materials including aluminum, steel, structural plastics and fiber-reinforced composites. These components may be constructed using the profile extrusion process just described, but may also be manufactured by other processes known in the art, including but not limited to metal forming, welding, milling or injection molding processes.

It is clear that the construction method utilizing constant cross section materials just described may also be applied with great benefit to bumpers that are not configurable per the most preferred embodiment described above. For example, a bumper may comprise a single length of constant cross section material similar to center body 111, but without telescoping end assemblies. This length of material may be straight or curved as described above. In this embodiment, cavities 135 in FIG. 3 may serve for inside-bumper storage of vehicle accessories, including jacks, lights, tools, and so forth. In yet another alternate embodiment of a bumper employing this construction method, a bumper may comprise a center body and a non-telescoping end cap rigidly attached to each end the center body, wherein each of these components is constructed from raw materials of constant cross section. The center body and end caps may be cropped as described above to provide for aesthetically pleasing visual effects.

While this description sets forth exemplary embodiment as well as alternative embodiments, it is evident to those skilled in the art that the invention is susceptible to still further variation without departing from the proper scope or fair meaning of the present invention. Furthermore, while an exemplary embodiment has been shown as applied to a specific vehicle design, it is clear that the invention may be applied to different types of vehicle designs.

I claim:

1. A configurable bumper assembly for a vehicle having a vehicle axis extending along a direction of travel of the vehicle, the configurable bumper assembly comprising:
   a center body configured to be rigidly attached to a vehicle, the center body comprising a bumper axis extending along a length of the center body, the center body comprising a constant center body cross section that is formed in a near-net shape by a profile extrusion process; and
   a first end cap with a constant end cap cross section that is formed in a near-net shape by a profile extrusion process;
   wherein the first end cap is attached to the center body such that an orientation of an end cap axis extending along an end cap length of the first end cap is at a nonzero angle to a bumper axis extending along a center body length of the center body.

2. The configurable bumper assembly of claim 1, further comprising one or more telescoping end assemblies slidably attached to the center body and adapted to slide in a direction parallel to the bumper axis and perpendicular to the vehicle axis.

3. The configurable bumper assembly of claim 2, further comprising a locking mechanism for each of the telescoping end assemblies, whereby each of the telescoping end assemblies may be secured in at least two different positions along the bumper axis.

4. The configurable bumper assembly of claim 3, wherein said different positions comprise a first operational position that provides the configurable bumper assembly an overall length that is equal to or greater than a track width of the vehicle.

5. The configurable bumper assembly of claim 4, wherein said different positions further comprise a second operational position that provides the configurable bumper assembly an overall length that is equal to or less than an inner extremity occupied by wheels of the vehicle.

6. The configurable bumper assembly of claim 2, wherein each of the telescoping end assemblies further comprises one or more bearing surfaces that are adapted to slide laterally inside said center body.

7. The configurable bumper assembly of claim 2, wherein each of the telescoping end assemblies further comprises one or more bearing surfaces that are adapted to slide laterally on an outside surface of said center body.

8. The configurable bumper assembly of claim 1, further comprising a second end cap with a second constant end cap cross section that is formed in a second near-net shape by a second profile extrusion process;
   wherein the second end cap is attached to the center body such that a second orientation of a second end cap axis extending along a second end cap length of the second end cap is at a nonzero angle to the bumper axis.

9. The configurable bumper assembly of claim 1, wherein the center body has a double-walled U shape.

10. A method for manufacturing a bumper for a vehicle, the method comprising:
    forming a center body of the bumper in a near-net shape by a profile extrusion process such that the center body has a constant cross section;
    after forming the center body, cutting the center body to length;
    forming a first end cap with a constant end cap cross section that is formed in a near-net shape by a profile extrusion process; and
    attaching the first end cap to the center body such that an orientation of an end cap axis extending along an end cap length of the first end cap is at a nonzero angle to a bumper axis extending along a center body length of the center body.

11. The method of claim 10, wherein the constant cross section has a double-walled U shape.

12. The method of claim 10, further comprising:
    forming a second end cap in a near-net shape by a profile extrusion process;
    after forming the first end cap, cutting the first end cap to length; and
    after forming the second end cap, cutting the second end cap to length.

13. The method of claim 12, further comprising slidably attaching the second end cap to the center body.

14. The method of claim 10, further comprising cutting said center body to length at an angle that is oblique to a bumper axis extending along a length of the bumper, perpendicular to the constant cross section.

15. A method for manufacturing a bumper for a vehicle, said bumper comprising a center body and a first end cap, said method comprising:
    forming the center body with a constant center body cross section that is formed in a near-net shape by a profile extrusion process;
    forming the first end cap with a constant end cap cross section that is formed in a near-net shape by a profile extrusion process; and
    attaching the first end cap to the center body such that an orientation of an end cap axis extending along an end cap length of the first end cap is at a nonzero angle to a bumper axis extending along a center body length of the center body.

16. The method of claim 15, wherein forming the first end cap comprises cropping the first end cap at an oblique angle to the end cap axis.

17. The method of claim 15, wherein attaching the first end cap to the center body comprises positioning the end cap axis perpendicular to the bumper axis.

* * * * *